UNITED STATES PATENT OFFICE.

ISAAC H. TERRELL AND WILLIAM SCHAUM, OF CAMBRIDGE, OHIO.

DECORATING COMPOSITION.

1,243,362.

Specification of Letters Patent.  Patented Oct. 16, 1917.

No Drawing. Application filed July 8, 1916. Serial No. 108,283.

*To all whom it may concern:*

Be it known that we, ISAAC H. TERRELL and WILLIAM SCHAUM, citizens of the United States of America, and residents of Cambridge, county of Guernsey, and State of Ohio, have invented certain new and useful Improvements in Decorating Compositions, of which the following is a specification.

This invention relates to a decorating composition for glassware, enameled metal ware, pottery ware, aluminum ware, and the like.

The primary object of the invention is to provide a composition which may be readily applied to articles of glass, pottery, enameled and aluminum ware for producing decorative designs, which possesses a high polish or luster and which is of a permanently endurable character.

The composition consists of 65 parts powdered aluminum, 35 parts of a softening and polishing flux consisting mainly of chemically prepared glass in fusible powder form, and 5 parts of a cohesion medium embodying a fixed vegetable oil, as oil of turpentine, said medium being preferably printers' ink or English printing oil, which latter is composed mainly of beeswax, resin and fat oil of turpentine.

In some cases, particularly for application to glass and enameled ware, we have found that a relatively small amount, as 10 parts, of oxid of zinc may be advantageously substituted for an equal number of parts of the flux above-mentioned.

In practice the said cohesion medium is applied to a rubber roller which is then passed over an impression pad, also of rubber, which bears the design to be applied to the ware. The said pad is then applied to the ware to transfer the inked design to the latter. The transferred design is then dusted with the pre-mixed powdered aluminum and flux, after which the surplus powder is wiped off. The ware is then subjected to a heat of from 900 degrees F. to 950 degrees F. to fix the design thereon.

What is claimed is—

1. A decorating composition of the character mentioned comprising powdered aluminum, a flux composed of chemically prepared fusible glass, and a liquid cohesion medium.

2. A decorating composition of the character mentioned comprising 65 parts powdered aluminum, 35 parts of a fusible glass flux in powder form, and 5 parts of a liquid cohesion medium embodying a vegetable printing oil.

3. A decorating composition of the character mentioned comprising 65 parts powdered aluminum, 35 parts chemically prepared fusible glass flux, and 5 parts printers' ink.

In testimony whereof we affix our signatures in presence of two witnesses.

ISAAC H. TERRELL.
WILLIAM SCHAUM.

Witnesses:
T. A. BONNELL,
CARL M. OSHE.